United States Patent
Han et al.

(10) Patent No.: US 12,388,606 B2
(45) Date of Patent: Aug. 12, 2025

(54) APPARATUS AND METHOD FOR BLOCK ACKNOWLEDGEMENT WITHIN REDUCED DURATION

(71) Applicant: SAMSUNG ELECTRONICS CO., LTD., Suwon-si (KR)

(72) Inventors: Jonghun Han, Gwacheon-si (KR);
Chulho Chung, Yongin-si (KR);
Srinivas Kandala, San Jose, CA (US);
Myeongjin Kim, Seongnam-si (KR);
Eunsung Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 818 days.

(21) Appl. No.: 17/455,041

(22) Filed: Nov. 16, 2021

(65) Prior Publication Data
US 2022/0173872 A1    Jun. 2, 2022

Related U.S. Application Data

(60) Provisional application No. 63/118,785, filed on Nov. 27, 2020.

(30) Foreign Application Priority Data

May 10, 2021    (KR) .................. 10-2021-0060335

(51) Int. Cl.
*H04L 5/00*    (2006.01)
*H04L 1/00*    (2006.01)
(Continued)

(52) U.S. Cl.
CPC .......... *H04L 5/0055* (2013.01); *H04L 1/0007* (2013.01); *H04L 1/16* (2013.01);
(Continued)

(58) Field of Classification Search
CPC ... H04L 5/0055; H04L 1/1614; H04L 1/1825; H04L 1/1864; H04L 1/1896;
(Continued)

(56) References Cited

U.S. PATENT DOCUMENTS 9,337,961 B2    5/2016    Wentink
9,929,847 B2    3/2018    Asterjadhi et al.
(Continued)

FOREIGN PATENT DOCUMENTS

JP        2006-217242        8/2006
WO    WO-2018075098 A1 *    4/2018    .......... H04W 28/065

OTHER PUBLICATIONS

Extended European Search Report dated Apr. 4, 2022 in corresponding European Patent Application No. 21208195.4 (10 pages).
(Continued)

*Primary Examiner* — Mounir Moutaouakil
(74) *Attorney, Agent, or Firm* — Morgan, Lewis & Bockius LLP

(57) ABSTRACT

The present disclosure provides a wireless communication method. The wireless communication method includes a first device used to negotiate a buffer size with a second device, provide data including a duration field to the second device, and receive a first block acknowledgement from the second device. The first block acknowledgement may include a first block acknowledgement bitmap. The duration field included in the data from the first device may include an indication of a duration associated with the first block acknowledgment that is less than an upper bound duration associated with a second block acknowledgement that includes a second block acknowledgement bitmap with a maximum length.

11 Claims, 18 Drawing Sheets

(51) Int. Cl.
*H04L 1/16* (2023.01)
*H04L 1/1607* (2023.01)
*H04L 1/1825* (2023.01)
*H04L 1/1829* (2023.01)
*H04W 28/04* (2009.01)
*H04W 84/12* (2009.01)

(52) U.S. Cl.
CPC .......... *H04L 1/1614* (2013.01); *H04L 1/1825* (2013.01); *H04L 1/1864* (2013.01); *H04W 28/04* (2013.01); *H04W 84/12* (2013.01)

(58) Field of Classification Search
CPC ....... H04L 1/0007; H04L 1/16; H04L 1/1835; H04L 1/1874; H04W 84/12; H04W 28/04; H04W 28/26
See application file for complete search history.

(56) References Cited

U.S. PATENT DOCUMENTS

| | | | |
|---|---|---|---|
| 10,225,047 B2 | 3/2019 | Merlin et al. | |
| 10,334,007 B2 | 6/2019 | Chun et al. | |
| 10,412,744 B2 | 9/2019 | Chun et al. | |
| 10,536,979 B2 | 1/2020 | Ko et al. | |
| 10,581,580 B2 | 3/2020 | Chu et al. | |
| 10,707,986 B2 | 7/2020 | Merlin et al. | |
| 2006/0034274 A1 | 2/2006 | Kakani et al. | |
| 2013/0301569 A1 | 11/2013 | Wang et al. | |
| 2016/0330788 A1* | 11/2016 | Zheng | H04W 28/0205 |
| 2017/0257888 A1* | 9/2017 | Kneckt | H04W 74/0816 |
| 2019/0268099 A1 | 8/2019 | Chu et al. | |
| 2019/0289495 A1 | 9/2019 | Chu et al. | |
| 2019/0364555 A1* | 11/2019 | Huang | H04W 72/51 |
| 2021/0111836 A1* | 4/2021 | Huang | H04L 1/1642 |
| 2022/0210834 A1* | 6/2022 | de la Oliva | H04L 1/0017 |
| 2023/0140312 A1* | 5/2023 | Ajami | H04W 72/0453 370/329 |

OTHER PUBLICATIONS 802.11 Working Group of the LAN/Man Standards Committee of the IEEE Computer Society: Draft Standard for Information technology-Tele-communications and information exchange between systems Local and metropolitan area networks-Specific requirements; Part 11: Wireless LAN Medium Access Control(MAC) and Physical Layer (PHY) Specifications, Oct. 2020, 820 pages.

\* cited by examiner

FIG. 8A

| Upper Bound Field | Upper Bound of BA Bitmap subfield Length |
|---|---|
| 00 | 64 |
| 01 | 256 |
| 10 | 512 |
| 11 | 1024 |

APPARATUS AND METHOD FOR BLOCK ACKNOWLEDGEMENT WITHIN REDUCED DURATION

CROSS-REFERENCE TO RELATED APPLICATIONS

This application claims the benefit of U.S. Provisional Application No. 63/118,785, filed on Nov. 27, 2020, in the US Patent Office and Korean Patent Application No. 10-2021-0060335, filed on May 10, 2021 in the Korean Intellectual Property Office, the disclosures of which are incorporated by reference herein in their entirety.

BACKGROUND

The inventive concept relates to wireless communication, and more particularly, to an apparatus and method for block acknowledgement within reduced duration.

A wireless local area network (WLAN) connects two or more apparatuses to each other by using a wireless signal transmission method for the transfer of information or data. The WLAN technology is based on the Institute of Electrical and Electronics Engineers (IEEE) 802.11 standard, which includes standards such as 802.11b, 802.11a, 802.11g, 802.11n, 802.11ac, and 802.11ax, or the like. This standard supports a wireless transmission speeds of up to about 1 Gbytes/s by using orthogonal frequency-division multiplexing (OFDM) technology.

In 802.11ac, data may be simultaneously transmitted to multiple users by using a multi-user (MU) multi-input multi-output (MIMO) (MU-MIMO) technique. In 802.11ax, referred to as high efficiency (HE), multi-connection may be implemented by the MU-MIMO scheme and providing an available subcarrier to users in sharing manner based on orthogonal frequency-division multiplexing access (OFDMA). Therefore, the WLAN system to which 802.11ax is applied may effectively support communication in dense areas and outdoors.

In 802.11be, referred to as extremely high throughput (EHT), support of about 6 GHz unlicensed spectrum, utilization of up to about 320 MHz bandwidth per channel, introduction of hybrid automatic repeat and request (HARQ), support of up to 16×16 multi-input multi-output (MIMO), or the like will be implemented. Therefore, a next-generation WLAN system is expected to support effectively low latency and hyper-speed transmission, such as new radio (NR) that is 5G technology.

SUMMARY

The inventive concept provides an apparatus and method for providing reduced duration for block acknowledgement.

According to an aspect of the inventive concept, there is provided a method for wireless communication by a first device including: negotiating a buffer size with a second device; providing data including a duration field to the second device; and receiving a first block acknowledgement from the second device, the first block acknowledgement including a first block acknowledgement bitmap, wherein a first duration defined by the duration field is less than a second duration for a second block acknowledgement bitmap including a second block acknowledgement with a maximum length of at least one block acknowledgement bitmap corresponding to the negotiated buffer size.

According to another aspect of the inventive concept, there is provided a first device for wireless communication, the first device including: a transceiver; and processing circuitry configured to: negotiate a buffer size with a second device via the transceiver, provide data including a duration field to the second device via the transceiver, and receive a first block acknowledgement from the second device via the transceiver, the first block acknowledgment including a first block acknowledgement bitmap, wherein a first duration defined by the duration field is less than a second duration for a second block acknowledgement including a second block acknowledgement bitmap with a maximum length from among at least one block acknowledgement bitmap corresponding to the negotiated buffer size.

According to another aspect of the inventive concept, there is provided a method for wireless communication by a second device including: negotiating a buffer size with a first device; receiving data including a duration field from the first device; and providing a first block acknowledgement to the first device, the first block acknowledgement including a first block acknowledgement bitmap, wherein a first duration defined by the duration field is less than a second duration for a second block acknowledgement including a second block acknowledgement bitmap with a maximum length of at least one block acknowledgement bitmap corresponding to the negotiated buffer size.

According to another aspect of the inventive concept, there is provided a method for wireless communication by a first device including: providing data to a second device; and receiving a first block acknowledgement from the second device, the first block acknowledgement including a first block acknowledgement bitmap, wherein the providing of the data includes limiting a length of the first block acknowledgement bitmap based on a size of the data.

According to another aspect of the inventive concept, there is provided a method for wireless communication by a first device including: determining an upper bound duration for a block acknowledgment based on a maximum length of one or more block acknowledgment bitmaps that correspond to a size of a data transmission, estimating a reduced duration based on the determined upper bound duration and at least one of a transmission speed of the block acknowledgement, a second block acknowledgment that has been previously from a second device, or channel state information between the first device and the second device, transmitting the data transmission to the second device, wherein the data transmission includes a field indicating the reduced duration, and receiving the block acknowledgement from the second device within the reduced duration.

BRIEF DESCRIPTION OF THE DRAWINGS

Embodiments of the inventive concept will be more clearly understood from the following detailed description taken in conjunction with the accompanying drawings in which:

FIGS. 8A and 8B are diagrams of encoding of fields representing upper bounds of block acknowledgement bitmap subfield lengths, according to example embodiments;

DETAILED DESCRIPTION OF THE EMBODIMENTS

Figure 1:
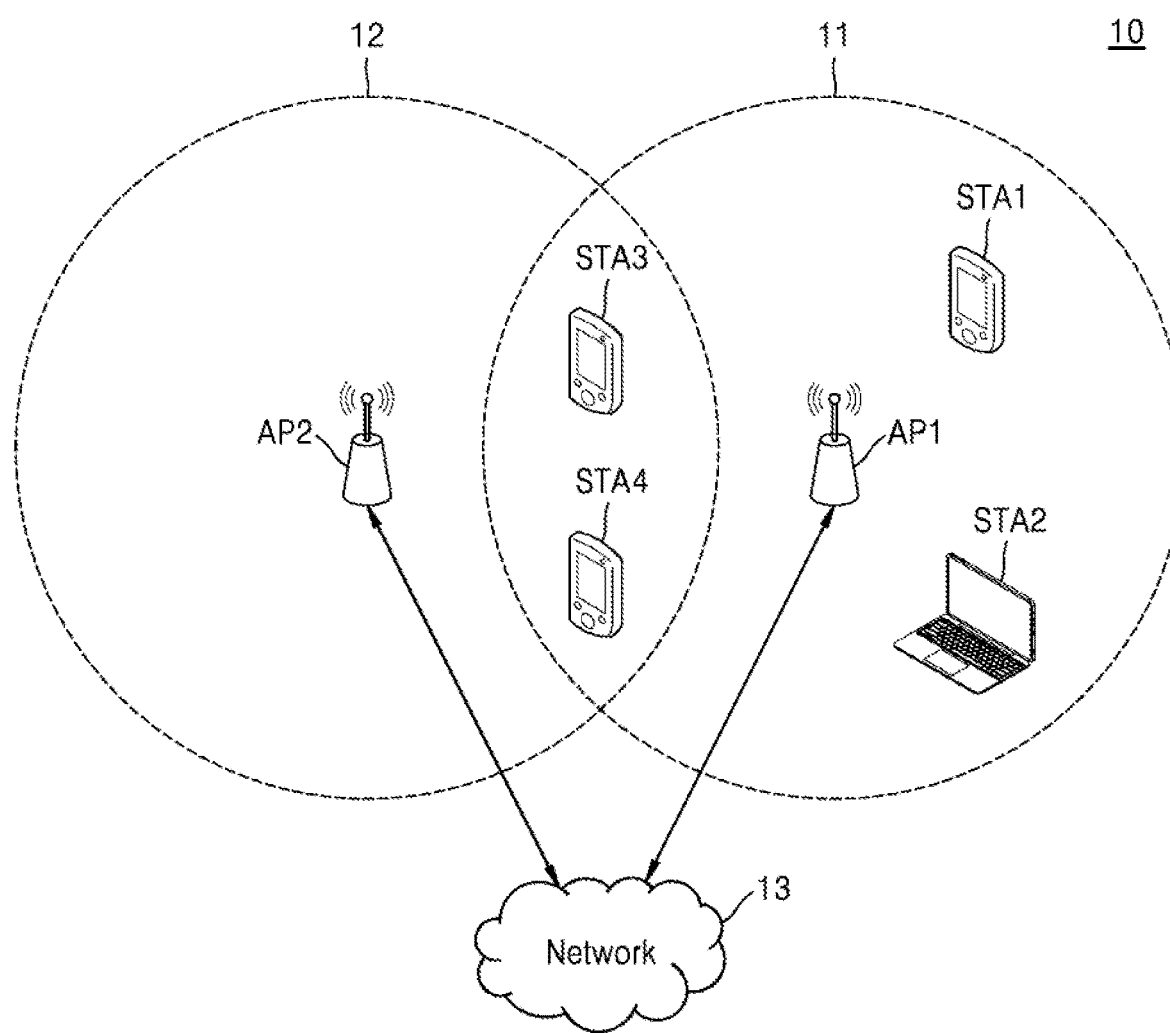
FIG. 1 is a diagram illustrating a wireless communication system according to an example embodiment.

The present disclosure relates generally to wireless communications, and more particularly to an apparatus and method for block acknowledgement within a reduced duration.

Wireless communications over a radio channel may include errors in transmitted packets (e.g., under the influence of interferences among devices in the wireless communications system, multi-path fading, noises, etc.). Techniques for mitigating such errors may include a Forward Error Correction Code (FEC) scheme in which the probability of communication error occurrence may be lowered by a transmitting device additionally sending redundant information (e.g., such that copies of redundant information may have each have a likelihood of being successfully received by a receiving device). Further, Automatic Repeat Request (ARQ) scheme may be implemented in some wireless communication systems, in which packets may be retransmitted when errors have occurred. A Hybrid Automatic Retransmission Request (HARQ) scheme may be a hybrid scheme combining aspects of FEC and ARQ.

In addition to an ARQ scheme in which reception results are acknowledged on a packet-by-packet basis, a block ARQ scheme in which reception results of a plurality of transmitted packets are acknowledged as a group may be implemented (e.g., through block ARQ messaging). That is, a transmitting device (e.g., access points) and a receiving device (e.g., stations) may communicate with each other based on a block acknowledgement mechanism for more efficient ARQ functionality. For example, a plurality of medium access control (MAC) protocol data units (PDU) (MPDU) may be received, by a recipient device from an originator device, as messages exchanged between medium access control (MAC) entities. Instead of transmitting (by a recipient device to an originator device) a plurality of acknowledgements (ACKs) corresponding to each of a plurality of MPDUs, a receiving device may transmit one block acknowledgement to a transmitting device in response to an aggregated MPDU (A-MPDU).

As a result, a block acknowledgement may include a bitmap, and each bit of the bitmap may indicate a status of the received MPDU (for example, success or failure, ACK or NACK, etc.). In the block acknowledgement mechanism, a device, which transmits data (for example, one or more MPDUs) and receives block acknowledgement, may be referred to as an originator or a sender, and a device receiving data and transmitting block acknowledgement may be referred to as a recipient or a receiver. In some cases, block acknowledgement may be referred to as BA, Block Ack, etc.

The originator may set a period in which other devices are prevented from accessing a channel while data is transmitted to the recipient and block acknowledgement is received from the recipient. For example, the MPDU transmitted by the originator may include a duration field that defines a length of the period (for example, a duration) for receiving block acknowledgement. Other devices (for example, one or more other stations) may identify the duration based on the duration field, and transmission of signals by other devices may be blocked during the duration (e.g., such that other devices do not transmit signals that may interfere with the MPDU and/or corresponding BA during the duration). Accordingly, when only a portion of the duration is used for transmission of block acknowledgement, waste of radio resource (for example, a frequency band and/or time) or airtime may occur.

According to the techniques described herein, an originator may reduce a duration for transmission of a block acknowledgement, and a recipient may transmit the block acknowledgement to the originator according to the reduced duration. Accordingly, radio resource waste may be prevented, a transmission rate may be increased, and the efficiency of the wireless communication system may be improved. Various embodiments of the present disclosure are described in more detail below in conjunction with accompanying drawings.

FIG. 1 is a diagram illustrating a wireless communication system 10 according to an example embodiment. FIG. 1 illustrates a wireless local area network (WLAN) system as an example of the wireless communication system 10.

To describe embodiments of the inventive concept, an orthogonal frequency-division multiplexing (OFDM) or OFDM-access (A) (OFDMA)-based wireless communication system, in particular, the IEEE 802.11 standard, will be used as the primary focus. However, a primary subject of the inventive concept may be applicable with some modifications within the scope of the inventive concept to other communication systems with similar technical backgrounds and channel types (for example, long term evolution (LTE), LTE-advanced (A) (LTE-A), new radio (NR), wireless broadband (WiBro), and a cellular system such as global system for mobile communication (GSM), and a short-range communication system such as Bluetooth and near field communication (NFC)), which will be feasible according to one of ordinary skill in the art.

In addition, various functions described below may be implemented or supported by artificial intelligence technology or one or more computer programs, and each of the computer programs may include computer-readable program code and may be executed on a computer-readable medium. The terms "application" and "program" may refer to one or more computer programs, software components, instruction sets, procedures, functions, objects, classes, instances, related data, or portions thereof suitable for implementation of suitable computer-readable program code. The term "computer-readable program code" may include all types of computer code with a source code, object code, and executable code. The term "computer-readable medium" may include all types of media that may be accessed by a computer, such as read-only memory (ROM), random access memory (RAM), a hard disk drive, a compact disk (CD), a digital video disk (DVD), or some other type of memory. The term "non-transitory" computer-readable media may exclude wired, wireless, optical, or other communication links that transmit transient electrical signals or other signals. The non-transitory computer-readable media may include media on which data may be permanently stored, and media on which data may be stored and later overwritten, such as a rewritable optical disk or erasable memory device.

In various embodiments of the inventive concept described below, a hardware method will be described as an example. However, because various embodiments of the inventive concept include technology using both hardware and software, various embodiments of the inventive concept do not exclude a software-based method.

In addition, a term referring to control information, a term referring to an entry, a term referring to a network entity, a term referring to messages, a term referring to components of an apparatus, or the like may be given for the convenience of description. Thus, the inventive concept is not limited to the terms to be described later, and other terms with equivalent technical meaning may be used.

Referring to FIG. 1, the wireless communication system 10 may include a first access point AP1, a second access point AP2, a first station STA1, a second station STA2, a third station STA3, and a fourth station STA4. The first and second access points AP1 and AP2 may be connected to a network 13 including the Internet, an internet protocol (IP) network, or other arbitrary networks. The first access point AP1 may provide a connection for the network 13 in a first coverage area 11 to the first station STA1, the second station STA2, the third station STA3, and the fourth station STA4, and the second access point AP2 may also provide a connection for the network 13 in a second coverage area 12 to the third and fourth stations STA3 and STA4. In some embodiments, the first and second access points AP1 and AP2 may communicate with at least one of the first station STA1, the second station STA2, the third station STA3, and the fourth station STA4, based on wireless fidelity (Wi-Fi) or other arbitrary WLAN connection technology.

An access point may be referred to as a router, a gateway, or the like, and a station may be referred to as a mobile station, a subscriber station, a terminal, a mobile terminal, a wireless terminal, a user equipment, a user, etc. A station may include a mobile device such as a mobile phone, a laptop computer, and a wearable apparatus, and may include a stationary apparatus such as a desktop computer and a smart TV.

The access point may allocate at least one resource unit (RU) to at least one station. The access point may transmit data via at least one allocated RU, and at least one station may receive data via at least one allocated RU. In 802.11ax (hereinafter, high efficiency (HE)), the access point may allocate a single RU to at least one station, while in 802.11be (hereinafter, extremely high throughput (EHT)) or next-generation IEEE 802.11 standards (hereinafter, EHT+), the access point may allocate a multi-RU (MRU) including two or more RUs to at least one station. For example, the first access point AP1 may allocate MRU to at least one of the first station STA1, the second station STA2, the third station STA3, and the fourth station STA4, and may transmit data via the allocated MRU.

The access points and the stations may communicate with each other based on a block acknowledgement mechanism. For example, as will be described later with reference to FIG. 3, a receiving device may transmit one block acknowledgement to a transmitting device, instead of transmitting to the transmitting device a plurality of acknowledges (Acks) corresponding to each of a plurality of medium access control (MAC) protocol data units (PDU) (MPDU), which have been received from the transmitting device as messages exchanged between MAC entities. As a result, block acknowledgement may include a bitmap (for example, a block acknowledgement bitmap subfield in FIG. 3), and each bit of the bitmap may indicate a status of the received MPDU (for example, success or failure). In the block acknowledgement mechanism, a device, which transmits data (for example, MPDU) and receives block acknowledgement, may be referred to as an originator or a sender, and a device receiving data and transmitting block acknowledgement may be referred to as a recipient or a receiver. In some cases, block acknowledgement may be referred to as BA, Block Ack, etc.

The originator may set a period in which other devices are prevented from accessing a channel while data is transmitted to the recipient and block acknowledgement is received from the recipient. For example, as will be described later with reference to FIG. 3, the MPDU transmitted by the originator may include a duration field that defines a length of the period (for example, a duration) for receiving block acknowledgement. Other devices (for example, one or more other stations) may identify the duration based on the duration field, and transmission of signals by other devices may be blocked during the duration (e.g., such that other devices do not transmit signals that may interfere with the MPDU and/or corresponding BA during the duration). Accordingly, as described later with reference to FIGS. 3, 4A, 4B, 5A, 5B, or the like, when only a portion of the duration is used for transmission of block acknowledgement, waste of radio resource (for example, a frequency band and/or time) or airtime may occur.

As described later with reference to drawings, an originator may reduce a duration for transmission of a block acknowledgement, and a recipient may transmit the block acknowledgement to the originator according to the reduced duration. Accordingly, radio resource waste may be prevented, a transmission rate may be increased, and the efficiency of the wireless communication system 10 may be improved. Hereinafter, example embodiments will be described for example, with reference to HE and/or EHT, but it should be understood that example embodiments are also applicable to EHT+.

Figure 2:
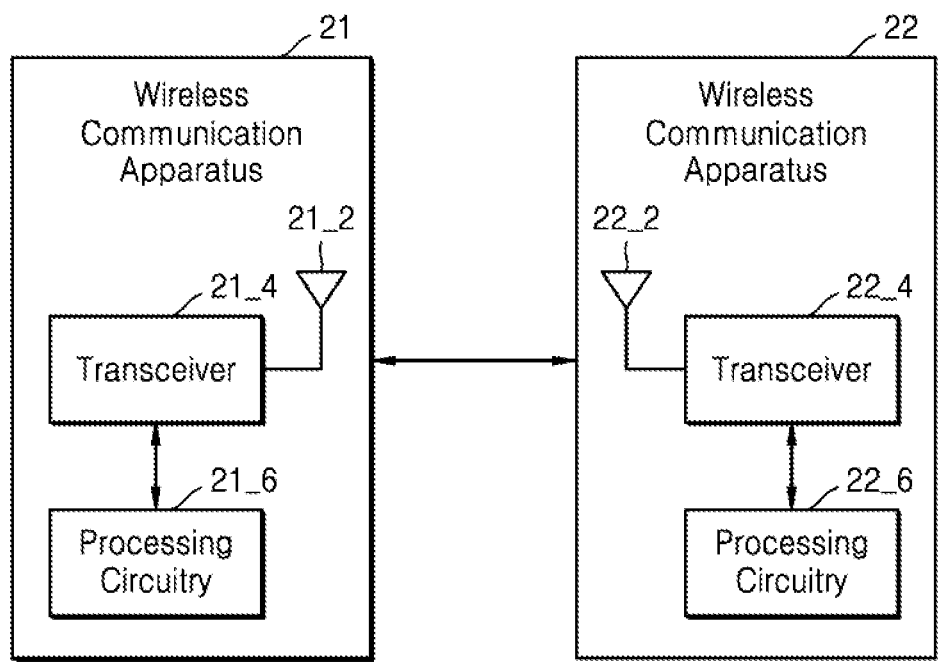
FIG. 2 is a block diagram of a wireless communication system according to an example embodiment.

FIG. 2 is a block diagram of a wireless communication system 20 according to an example embodiment. The block diagram of FIG. 2 may illustrate a first wireless communication apparatus 21 and a second wireless communication apparatus 22 communicating with each other in the wireless communication system 20. Each of the first wireless communication apparatus 21 and the second wireless communication apparatus 22 may include an arbitrary apparatus communicating in the wireless communication system 20, and may be referred to as an apparatus for wireless communication. In some embodiments, each of the first wireless communication apparatus 21 and the second wireless communication apparatus 22 may include an access point or station of a WLAN system.

Referring to FIG. 2, the first wireless communication apparatus 21 may include an antenna 21_2, a transceiver 21_4, and processing circuitry 21_6. In some embodiments, the antenna 21_2, the transceiver 21_4, and the processing circuitry 21_6 may be included in one package, or may be respectively included in different packages. The second wireless communication apparatus 22 may also include an antenna 22_2, a transceiver 22_4, and a processing circuit 22_6. Hereinafter, duplicate descriptions of the first wireless communication apparatus 21 and the second wireless communication apparatus 22 will be omitted.

The antenna 21_2 may receive a signal from the second wireless communication apparatus 22 and provide the signal to the transceiver 21_4, and may transmit the signal provided from the transceiver 21_4 to the second wireless communication apparatus 22. In some embodiments, the antenna 21_2 may include a plurality of antennas for multi-input multi-output (MIMO). In addition, in some embodiments, the antenna 21_2 may include a phased array for beamforming.

The transceiver 21_4 may process the signal received from the second wireless communication apparatus 22 via the antenna 21_2, and provide the processed signal to the processing circuitry 21_6. In addition, the transceiver 21_4 may process a signal provided by the processing circuitry 21_6, and may output the processed signal via the antenna 21_2. In some embodiments, the transceiver 21_4 may include an analog circuit such as a low noise amplifier, a mixer, a filter, a power amplifier, and an oscillator. In some embodiments, the transceiver 21_4 may process the signal received from the antenna 21_2 and/or the signal received from the processing circuitry 21_6 based on the control of the processing circuitry 21_6.

The processing circuitry 21_6 may extract information transmitted by the second wireless communication apparatus 22 by processing the signal received from the transceiver 21_4. For example, the processing circuitry 21_6 may extract information by demodulating and/or decoding the signal received from the transceiver 21_4. In addition, the processing circuitry 21_6 may generate a signal including information to be transmitted to the second wireless communication device 22, and provide the generated signal to the transceiver 21_4. For example, the processing circuitry 21_6 may provide, to the transceiver 21_4, the signal generated by encoding and/or modulating data to be transmitted to the second wireless communication apparatus 22. In some embodiments, the processing circuitry 21_6 may include a programmable component such as a central processing unit (CPU) and a digital signal processor (DSP), and a reconfigurable component such as a field programmable gate array (FPGA), and may include a component that provides a fixed-function such as an intellectual property (IP) core. In some embodiments, the processing circuitry 21_6 may include a memory storing data and/or a series of instructions, or may access the corresponding memory.

Herein, that the transceiver 21_4 and/or the processing circuitry 21_6 perform operations may be referred to as that the first wireless communication apparatus 21 performs the corresponding operations. Accordingly, operations performed by an access point may be performed by a transceiver and/or processing circuitry, and operations performed by a station may be performed by a transceiver and/or processing circuitry included in a station.

A transceiver may communicate bi-directionally, via antennas, wired, or wireless links as described above. For example, the transceiver may represent a wireless transceiver and may communicate bi-directionally with another wireless transceiver. The transceiver may also include or be connected to a modem to modulate the packets and provide the modulated packets for transmission, and to demodulate received packets. In some examples, transceiver may be tuned to operate at specified frequencies. For example, a modem can configure the transceiver to operate at a specified frequency and power level based on the communication protocol used by the modem.

In some aspects, the processing circuitry may include, or may be implemented by, a processor. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

In some aspects, techniques described herein may be implemented based on software. Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

Figure 3:
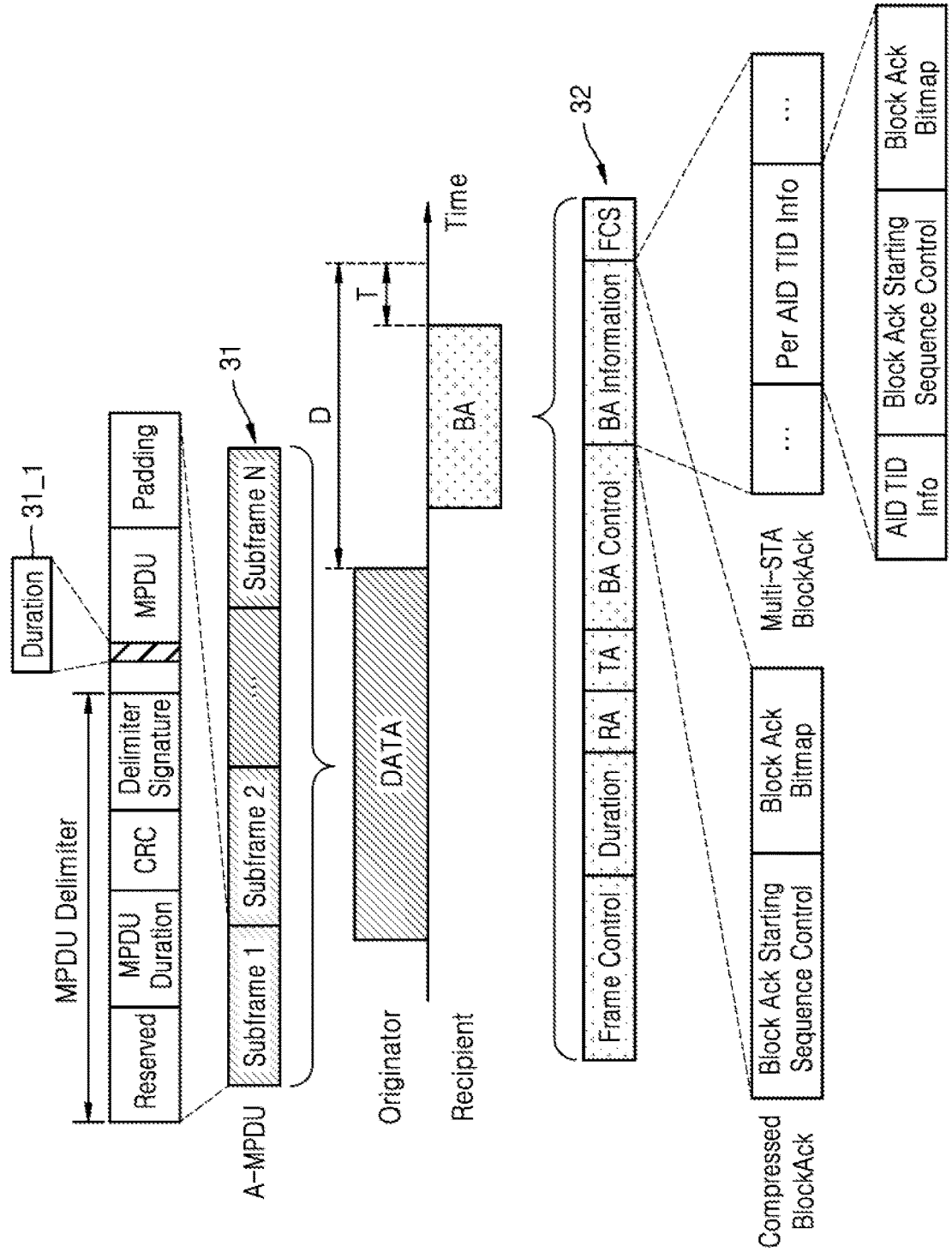
FIG. 3 is a diagram illustrating a block acknowledgement mechanism according to an example embodiment.

FIG. 3 is a diagram illustrating a block acknowledgement mechanism according to an example embodiment. FIG. 3 includes a timing diagram illustrating a process of transceiving (e.g., transmitting by an originator and receiving by a recipient) data DATA and block acknowledgement BA between the originator and the recipient, and illustrates an aggregated (A)-MPDU (A-MPDU) 31 included in the data DATA and a block acknowledgement frame 32 included in the block acknowledgement BA.

Referring to FIG. 3, the originator may transmit the data DATA to the recipient, and the data DATA may include a plurality of MPDUs. In some embodiments, the data DATA may include the A-MPDU 31. As illustrated in FIG. 3, the A-MPDU 31 may include a series of subframes, one subframe may include an MPDU delimiter, the MPDU, and a padding field, and the MPDU may include a duration field 31_1.

In some cases, a MAC frame (e.g., a data frame, an A-MPDU 31, etc.) may include information for block acknowledgment techniques described herein. For instance, A-MPDU 31 may include a control field or a sequence control field (e.g., such as a sequence control field 111 described with reference to FIG. 11A). A control field may generally include information for performing block acknowledgement procedures between an originator and a recipient.

As an example, a transmitter (e.g., an originator, a transmitting device, etc.) may transmit three packets (e.g., an A-MPDU 31 may include three MPDUs), such as MPDU #1, MPDU #2 and MPDU #3, in sequence. In the A-MPDU 31, the three packets (MPDU #1 to MPDU #3) may have the same Destination Address (DA). Each of the packets (MPDU #1 to MPDU #3) may be provided with a Sequence Number (SN) and a Fragmentation Number (FN). The SN may indicate an order in which packets are transmitted by a transmitting device (e.g., from an upper layer). In some examples, packets having a same SN may be transmitted over a plurality of packets (e.g., as channel conditions or channel state information demands). The FN may indicate the order the plurality of packets was transmitted in (e.g., divided over the transmission of packets having the same SN).

A receiver (e.g., a recipient, a receiving device, etc.) may determine whether or not packets are continuously received, may determine which packets are not received, etc., by comparing the SN and the FN of received packets with those of previously received packets. Aspects of SN and FN may be described in more detail herein, for example, with reference to FIG. 11A. For instance, a FN field may include four bits, some of which may be used to indicate block acknowledgement bitmap subfield lengths corresponding to negotiated buffer sizes, as described in more detail herein.

As described above with reference to FIG. 1, the originator may set a duration D by using the duration field 31_1. For example, as illustrated in FIG. 3, the block acknowledgement BA may be transmitted during the duration D, and during the duration D, the transmission of a signal from other devices except for the originator and the receiver may be blocked.

The block acknowledgement BA may include the block acknowledgement frame 32, and as illustrated in FIG. 3, the block acknowledgement frame 32 may include a frame control field, a duration field, a receiver address (RA) field, a transmitter address (TA) field, a block acknowledgement control field, a block acknowledgement information field, and a frame check sequence (FCS) field. The block acknowledgement control field may define a type of block acknowledgement. For example, the block acknowledgement control field may include a block acknowledgement type subfield representing one of various block acknowledgement types. As illustrated in FIG. 3, when the block acknowledgement type subfield indicates a compressed block acknowledgement, the block acknowledgement information field may include the block acknowledgement start sequence control subfield and the block acknowledgement bitmap subfield. In addition, when the block acknowledgement type subfield represents a multi-station (STA) block acknowledgement, the block acknowledgement information field may include at least one Per association identifier (AID) traffic identifier (TID) Info subfield corresponding to at least one station, and the Per AID TID Info subfield may include an AID TID Info subfield, the block acknowledgement start sequence control subfield, and the block acknowledgement bitmap subfield. An AID TID subfield may include an AID11 subfield with an identifier of a station (or the AID). Hereinafter, example embodiments may be described with reference to compressed block acknowledgement frames, but the techniques described herein are not limited thereto.

The block acknowledgement start sequence control subfield may represent a start sequence of sequences indicated by the following block acknowledgement bitmap subfield. For example, as described above, the data DATA received from the originator may include a plurality of MPDUs, and the recipient may set the block acknowledgement start sequence control subfield to indicate the start sequence, for representing a success or a failure of receiving some of the plurality of MPDUs by using the block acknowledgement bitmap subfield. As described above with reference to FIG. 1, each bit of the block acknowledgement bitmap subfield may correspond to the sequence included in the data DATA, for example, the MPDU, and may represent a status (for example, a success or a failure) of the MPDU. As to be described later with reference to FIGS. 4A and 4B, a length (for example, the number of bits) of the block acknowledgement bitmap subfield may have a plurality of variants, and accordingly, a length of block acknowledgement may be dependent on the length of the block acknowledgement bitmap subfield. Herein, the block acknowledgement bitmap subfield may be referred to as the block acknowledgement bitmap.

The originator and the recipient may perform a negotiation before transmitting the data DATA for the block acknowledgement mechanism. For example, as to be described later with reference to FIGS. 7A and 7B, the originator and the recipient may negotiate a size of a buffer to be used for transmission and receiving of the data DATA. The length of the block acknowledgement bitmap subfield described above may be related to the negotiated buffer size, and accordingly, as to be described later with reference to FIGS. 4A and 4B, a protocol standard may define at least one size of the block acknowledgement bitmap subfield, corresponding to the buffer size. The recipient may select one of at least one size of the block acknowledgement bitmap subfield based on the negotiated buffer size, the sequences preserved in the buffer, and the status of the sequences included in the data DATA, and may generate the block acknowledgement bitmap subfield of the selected size. In some embodiments, a block control field of the block acknowledgement frame 32 may include a value representing the selected size of the block acknowledgement bitmap subfield, and the originator may identify the length of the block acknowledgement bitmap subfield based on the block acknowledgement control field.

Depending on the length of the block acknowledgement bitmap subfield, the radio resource waste may occur during the duration D. For example, a protocol standard (for example, HE) may stipulate that the originator defines the duration D, considering the maximum size of the block acknowledgement bitmap subfield corresponding to the negotiated buffer size. Accordingly, when the recipient generates a block acknowledgement bitmap subfield with a size of less than the maximum size, even though transmission of the block acknowledgement BA is completed at an earlier time point, as illustrated in FIG. 3, the transmission of a signal by other devices except for the originator and the recipient may be blocked during a period T from a time point at which transmission of the block acknowledgement BA has been completed to a time point at which the duration D ends. Particularly, as to be described later with reference to FIGS. 4A and 4B, as the buffer size increases in a next-generation protocol standard, the maximum length of the block acknowledgement bitmap subfield may be increased, and accordingly, the radio resource waste may be increased. The originator may reduce the duration D to prevent the radio resource waste, and various examples of reducing the duration D by the originator will be described with reference to diagrams below.

Figure 4A:
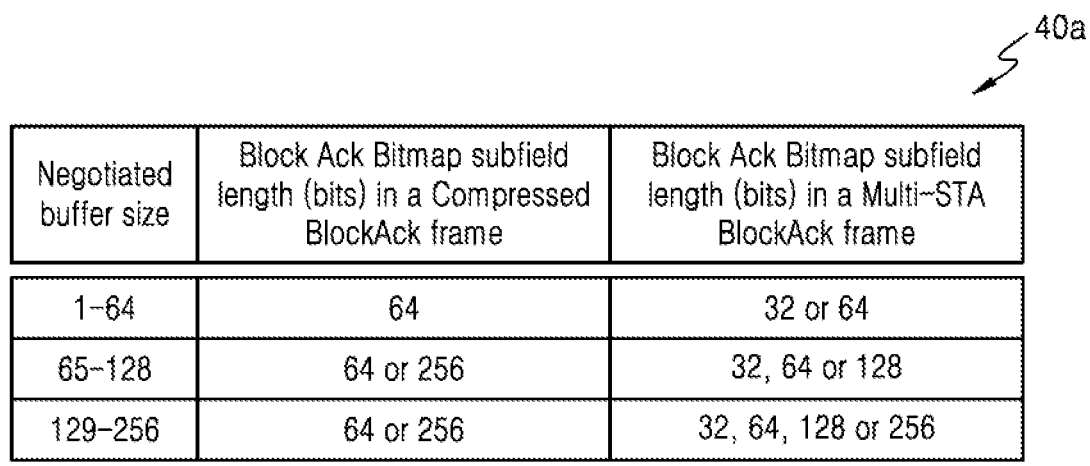
FIGS. 4A and 4B are diagrams representing buffer sizes and block acknowledgement bitmap subfield lengths, according to example embodiments.
Figure 4B:
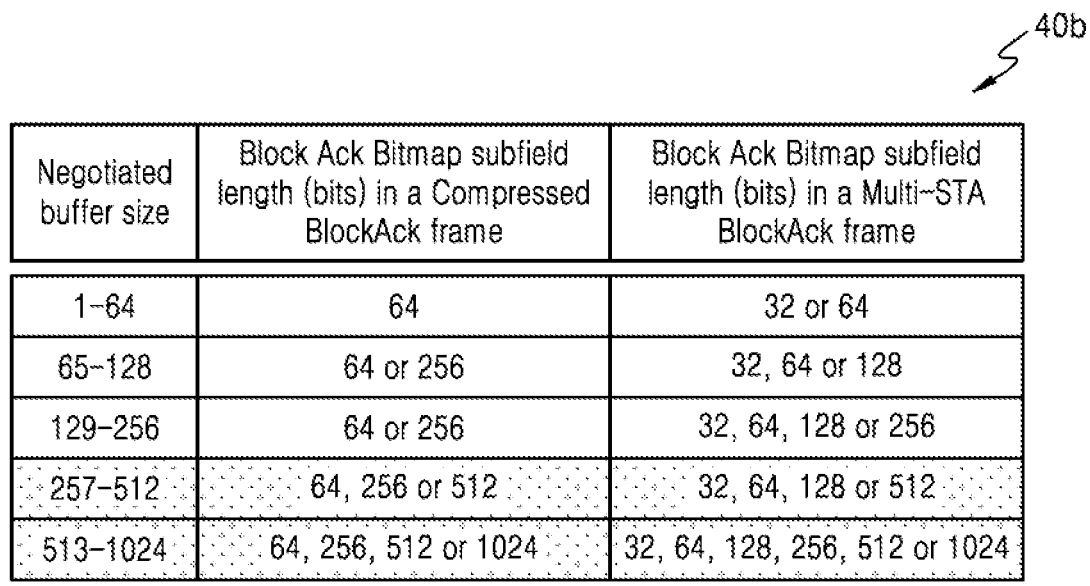

FIGS. 4A and 4B are diagrams representing buffer sizes and block acknowledgement bitmap subfield lengths, according to example embodiments. FIG. 4A illustrates a table 40a with the negotiated buffer size and the block acknowledgement bitmap subfield length in HE, and FIG. 4B illustrates a table 40b with the negotiated buffer size and the block acknowledgement bitmap subfield length in EHT. Hereinafter, FIGS. 4A and 4B will be described with reference to FIG. 3.

Referring to FIG. 4A, in HE, the originator and the recipient may negotiate the buffer size as one of 1 through 256, and the block acknowledgement bitmap subfield length may be determined according to a range of the negotiated buffer size. For example, as illustrated in FIG. 4A, when the negotiated buffer size is between 129 and 256, the block acknowledgement bitmap subfield length may be 64 or 256 in the compressed block acknowledgement frame, and may be 32, 64, 128, or 256 in the multi-STA block acknowledgement frame. Accordingly, when the originator has set the duration field to represent a duration for the block acknowledgement bitmap subfield with a length of 256, but the originator generates the block acknowledgement bitmap subfield with a length less than 256, radio resource waste may occur.

Referring to FIG. 4B, in EHT, the originator and the recipient may negotiate the buffer size as one of 1 through 1024, and the block acknowledgement bitmap subfield length may be determined according to a range of the negotiated buffer size. In comparison to the table 40a of FIG. 4A, the table 40b of FIG. 4B may show that the buffer size and the block acknowledgement bitmap subfield length increase. For example, as illustrated in FIG. 4B, when the negotiated buffer size is between 513 and 1024, the block acknowledgement bitmap subfield length may be 64, 256, 512, or 1024 in the compressed block acknowledgement frame, and may be 32, 64, 128, 256, 512, or 1024 in the multi-STA block acknowledgement frame. Accordingly, when the originator has set the duration field to represent a duration for the block acknowledgement bitmap subfield with a length of 1024, but the originator generates the block acknowledgement bitmap subfield with a length less than 1024, radio resource waste may occur. Hereinafter, example embodiments will be described with reference to mainly the table 40b of FIG. 40B.

Figure 5A:
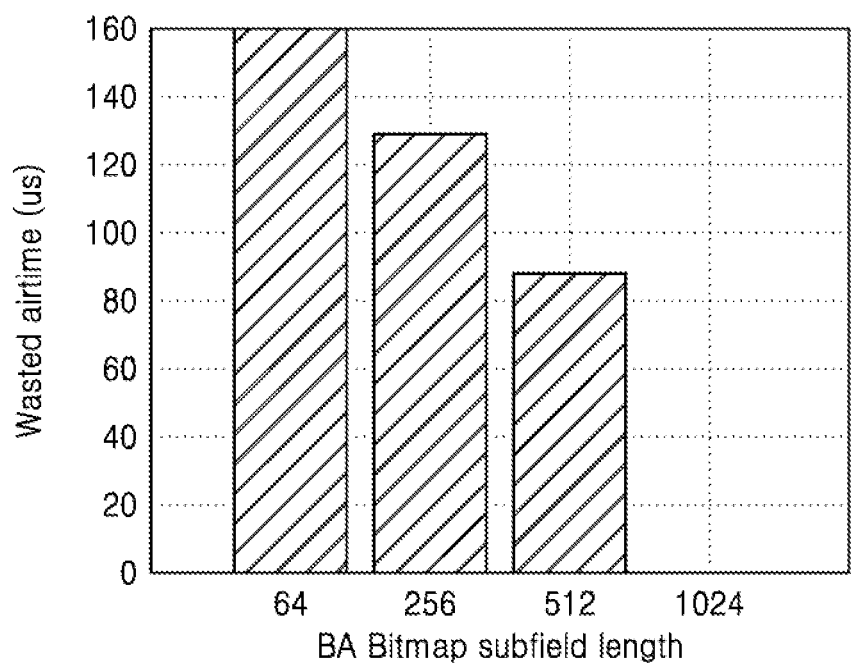
FIGS. 5A and 5B are graphs of examples of radio resource waste, according to example embodiments.
Figure 5B:
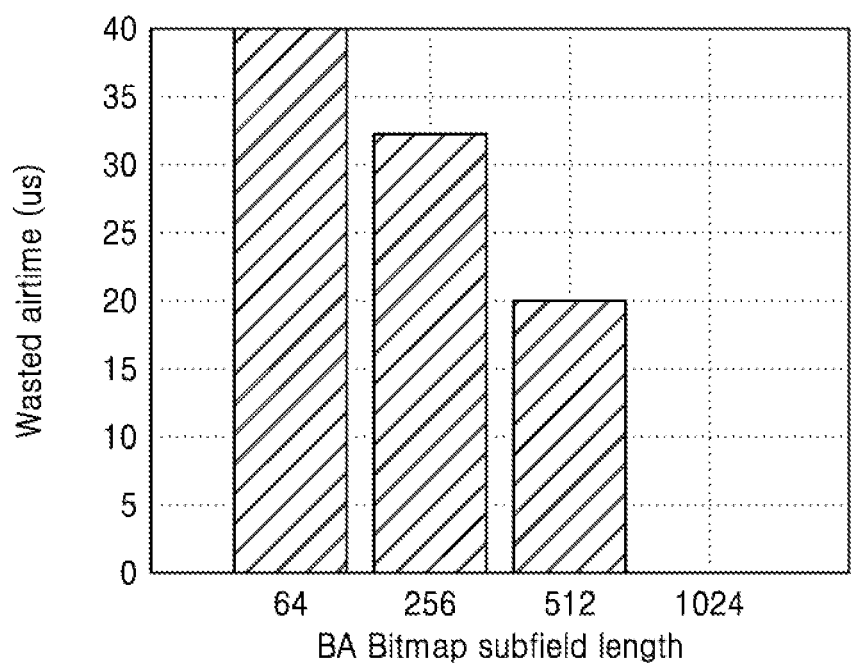

FIGS. 5A and 5B are graphs of examples of radio resource waste, according to example embodiments. Each of the graphs of FIGS. 5A and 5B illustrates, when the negotiated buffer size is 1024, the radio resource waste according to the block acknowledgement bitmap subfield length at a different transmission rate.

Referring to FIG. 5A, when the block acknowledgement bitmap subfield length is 1024 that corresponds to the negotiated buffer size, the radio resource waste may not substantially occur. Additionally, or alternatively, in the state where a transmission speed of the block acknowledgement is about 6 Mbps, when the block acknowledgement bitmap subfield length is 512, radio resource waste of about 90 μs may occur, and when the block acknowledgement bitmap subfield length is 256, radio resource waste of about 130 μs may occur, when the block acknowledgement bitmap subfield length is 64, radio resource waste of about 160 μs may occur.

Referring to FIG. 5B, when the block acknowledgement bitmap subfield length is 1024 that corresponds to the negotiated buffer size, radio resource waste may not substantially occur. Additionally, or alternatively, in the state where a transmission speed of the block acknowledgement is about 24 Mbps, when the block acknowledgement bitmap subfield length is 512, radio resource waste of about 20 μs may occur, when the block acknowledgement bitmap subfield length is 256, radio resource waste of about 32 μs may occur, and when the block acknowledgement bitmap subfield length is 64, radio resource waste of about 40 μs may occur. Due to the transmission speed (for example, about 24 Mbps) being greater than the transmission speed (for example, about 6 Mbps) in FIG. 5A, in the example of FIG. 5B, radio resource waste may be relatively (for example, about one over four) reduced.

Figure 6:
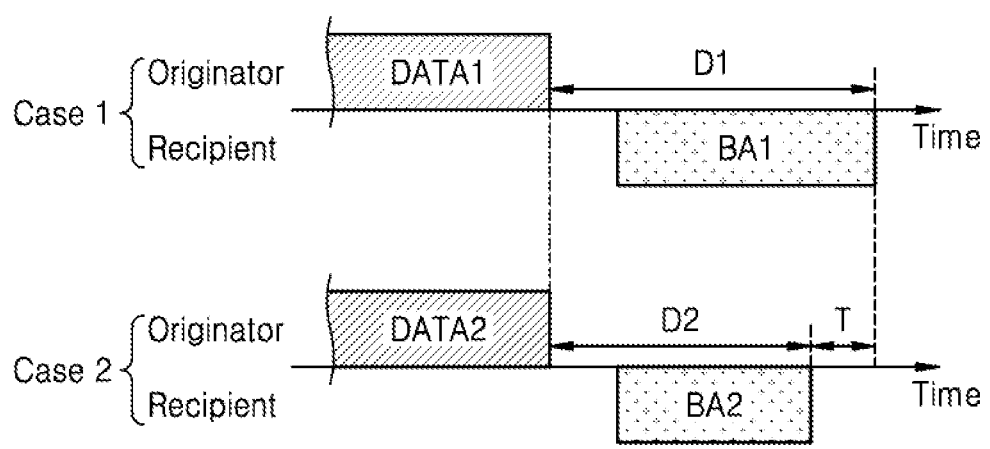
FIG. 6 is a timing diagram of a block acknowledgement mechanism according to an example embodiment.

FIG. 6 is a timing diagram of a block acknowledgement mechanism according to an example embodiment. In FIG. 6, a first case (e.g., Case 1) may represent an example in which the duration is not reduced, and a second case (e.g., Case 2) may represent an example in which the duration is reduced.

Referring to the upper portion of FIG. 6, the originator may generate a block acknowledgement bitmap subfield with the maximum length of at least one length of the block acknowledgement bitmap subfield corresponding to the negotiated buffer size. For example, in the first case in FIG. 6, the originator and the recipient may negotiate the buffer size as 1024, and next, the originator may transmit first data DATA1 to the recipient. The recipient may transmit, to the originator, a first block acknowledgement BA1 including a block acknowledgement bitmap subfield with the maximum length (for example, 1024) of block acknowledgement bitmap subfield lengths (for example, 64, 256, 512, and 1024) corresponding to the buffer size of 1024. Accordingly, as described above with reference to FIGS. 5A and 5B and illustrated in FIG. 6, radio resource waste may not occur during a first duration D1.

Referring to the lower portion of FIG. 6, the originator may generate a block acknowledgement bitmap subfield with a length less than the maximum length of at least one length of the block acknowledgement bitmap subfield corresponding to the negotiated buffer size. For example, in the second case in FIG. 6, the originator and the recipient may negotiate the buffer size as 1024, and next, the originator may transmit second data DATA2 to the recipient. The recipient may transmit, to the originator, a second block acknowledgement BA2 including the block acknowledgement bitmap subfield with a length (for example, 64, 256, or 512) less than the maximum length (for example, 1024) of the block acknowledgement bitmap subfield lengths (for example, 64, 256, 512, and 1024) corresponding to the buffer size of 1024.

The originator may reduce the duration, considering various factors despite of the negotiated buffer size (for example, 1024). In some embodiments, the originator may estimate the block acknowledgement bitmap subfield length based on a size of the second data DATA2, for example, the number of MPDUs included in the second data DATA2, and may estimate a second duration D2 based on the estimated block acknowledgement bitmap subfield length and a transmission speed of the block acknowledgement. In some embodiments, the originator may identify MPDUs that have not been successfully transmitted (or that are successfully transmitted) and MPDUs preserved in a buffer by the recipient, based on the block acknowledgement bitmap subfield included in the block acknowledgement received from the recipient in response to previous data transmission, and may sequentially estimate the block acknowledgement bitmap subfield length and the reduced second duration D2 based on the identified MPDUs. In some embodiments, the originator may sequentially estimate the block acknowledgement bitmap subfield length and the reduced second duration D2 based on a channel state between the originator and the recipient. Accordingly, as illustrated in FIG. 6, the transmission of the second block acknowledgement BA2 may be completed during the second duration D2, which is reduced by a period T (e.g., or a duration T, a time T, etc.) from the first duration D1. In other words, the duration D2 may be shorter than the first block acknowledgement BA1, which is transmitted during the first duration D1.

As an example, according to techniques described herein, a first duration (e.g., D2) defined by a duration field may be less than a second duration (e.g., D1) for a second block acknowledgement (e.g., BA1) that may, in some examples, comprise a second block acknowledgement bitmap with a maximum length (e.g., from among at least one block acknowledgement bitmap corresponding to the negotiated buffer size as described in more detail herein, for example, with reference to FIGS. 4A and 4B).

Figure 7A:
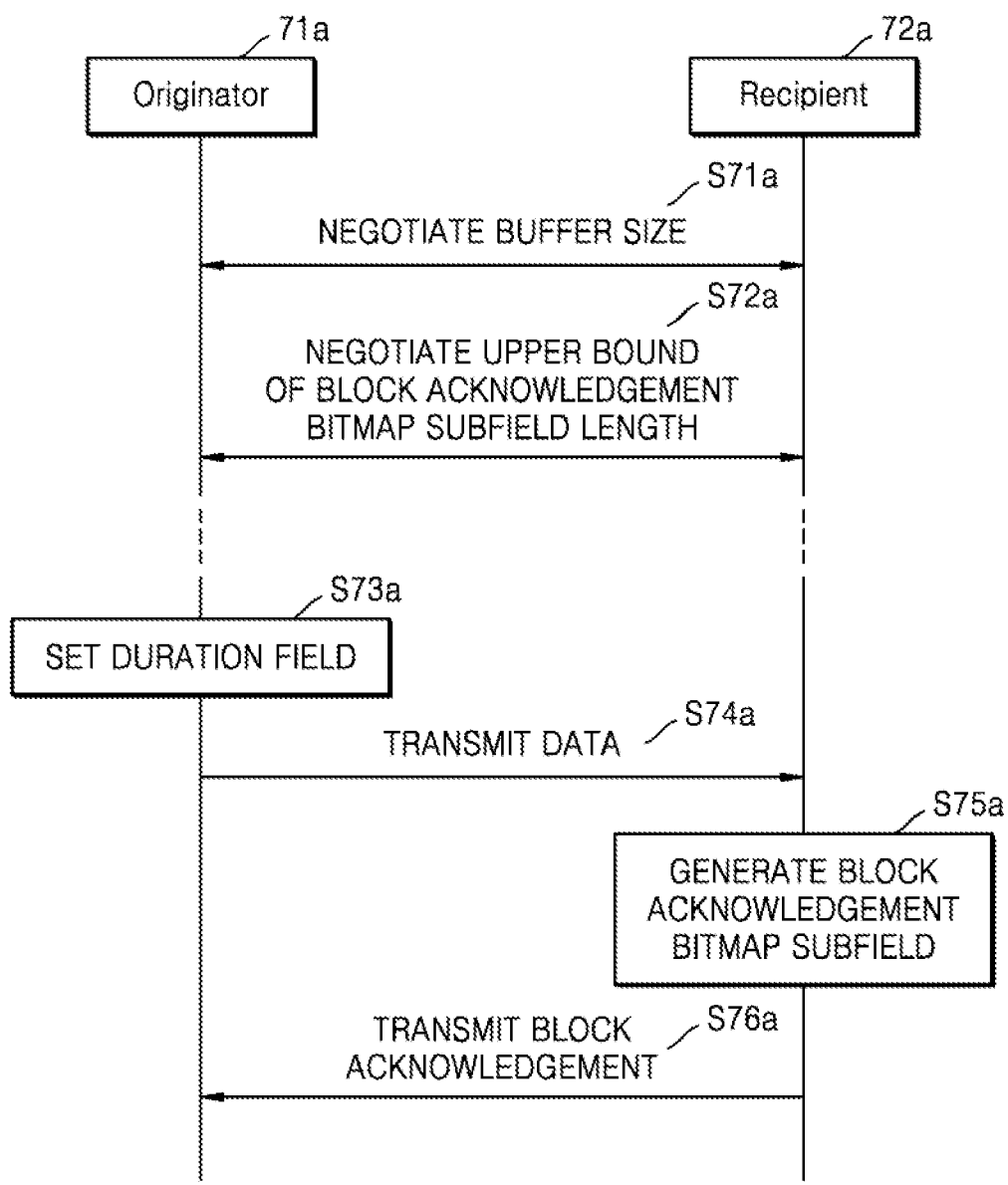
FIGS. 7A and 7B are message diagrams of examples of methods for block acknowledgement during a reduced duration, according to example embodiments.
Figure 7B:
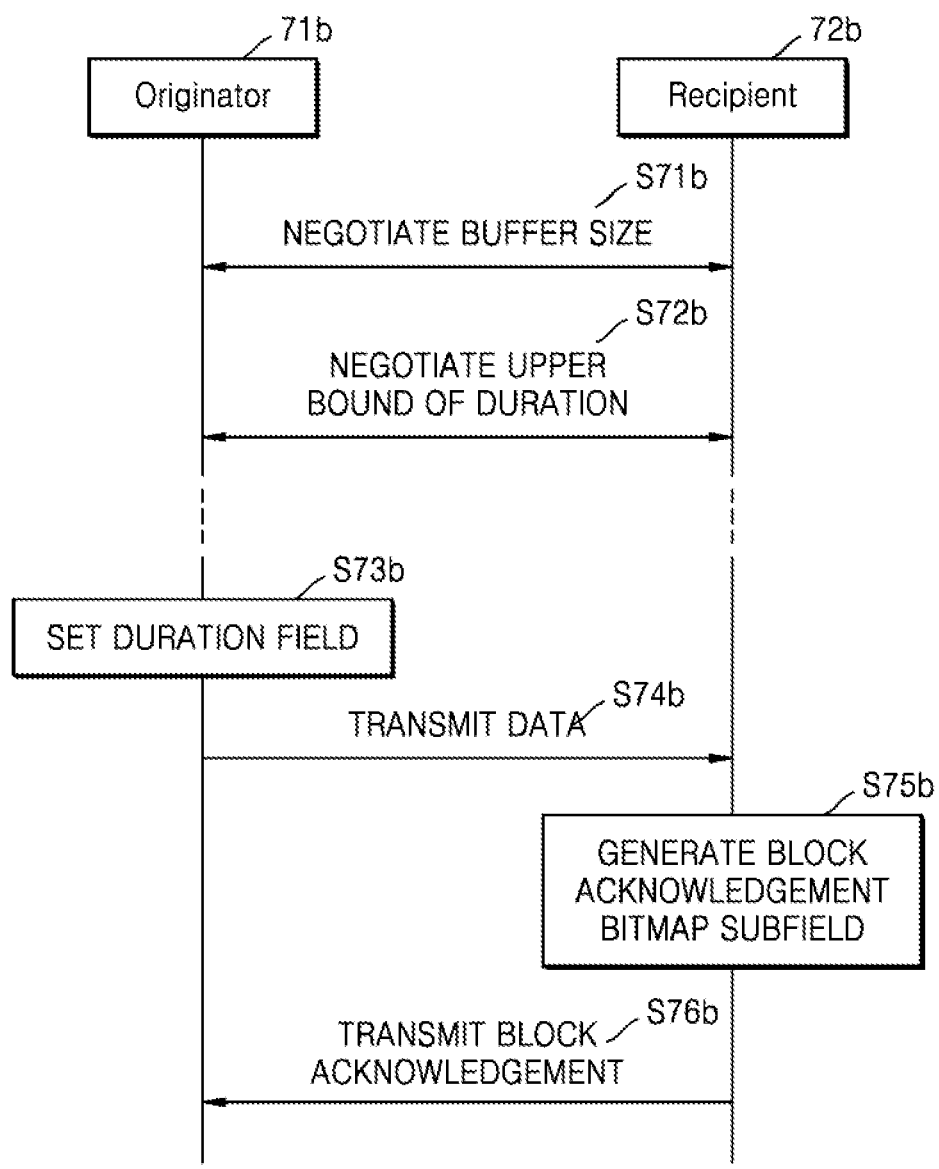

FIGS. 7A and 7B are message diagrams of examples of methods for the block acknowledgement during a reduced duration, according to example embodiments. Message diagrams of FIGS. 7A and 7B may illustrate operations of originators 71a and 71b and recipients 72a and 72b according to time. In some embodiments, the originators 71a and 71b and the recipients 72a and 72b may negotiate factors for reducing the duration in a negotiation process. Hereinafter, duplicate descriptions to be given with reference to FIGS. 7A and 7B will be omitted.

Referring to FIG. 7A, the originator 71a and the recipient 72a may negotiate the buffer size in operation S71a. For example, as described above with reference to FIG. 4A, in HE, the originator 71a and the recipient 72a may negotiate the buffer size as one of 1 through 256. In addition, as described above with reference to FIG. 4B, in EHT, the originator 71a and the recipient 72a may negotiate the buffer size as one of 1 through 1024. In some embodiments, the originator 71a and the recipient 72a may negotiate the buffer size by transceiving each other a negotiation message (for example, a request or a response).

In operation S72a, the originator 71a and the recipient 72a may negotiate an upper bound of the block acknowledgement bitmap subfield length. For example, the originator 71a and the recipient 72a may, as to be described later with reference to FIGS. 8A and 8B, negotiate the upper bound of the block acknowledgement bitmap subfield length by transceiving each other a negotiation message (for example, a request or a response) including a field representing the upper bound of the block acknowledgement bitmap subfield length. In some embodiments, the originator 71a and the recipient 72a may negotiate the upper bound of the block acknowledgement bitmap subfield length by transceiving each other an add block acknowledgement (ADDBA) request and an ADDBA response, and the ADDBA request and/or the ADDBA response may include a field representing the upper bound of the block acknowledgement bitmap subfield length.

As described above with reference to FIG. 3 and the like, a length of a block acknowledge may be dependent on a block acknowledgement bitmap subfield length, and accordingly, a duration of the block acknowledge may be limited due to a negotiated upper bound of the block acknowledgement bitmap subfield length.

In operation S73a, the originator 71a may set the duration field. For example, the originator 71a may determine the duration for the block acknowledge, based on the negotiated buffer size in operation S71a and the negotiated upper bound of the block acknowledgement bitmap subfield length in operation S72a, and may set the duration field to represent the determined duration. When the upper bound of the block acknowledgement bitmap subfield length negotiated in operation S72a is less than the maximum length of the block acknowledgement bitmap subfield lengths corresponding to the buffer size negotiated in operation S71a, the duration field may have a value representing the reduced duration.

In operation S74a, the originator 71a may transmit data, and the recipient 72a may receive data. For example, the originator 71a may transmit data including a plurality of MPDUs to the recipient 72a. Operation 73a described above may be related to operation S74a, subsequent thereto, in which data is transmitted, and accordingly, in the inventive concept, operations S73a and S74a may be collectively referred to as an operation in which the originator 71a provides data to the recipient 72a.

In operation S75a, the recipient 72a may generate the block acknowledgement bitmap subfield. For example, the recipient 72a may generate the block acknowledgement bitmap subfield representing statuses of the MPDUs (or sequences) included in data received in operation S74a, and the generated block acknowledgement bitmap subfield may have a length equal to or less than the upper bound negotiated in operation S72a.

In operation S76a, the recipient 72a may transmit the block acknowledgement, and the originator 71a may receive the block acknowledgement. The block acknowledgement may include the block acknowledgement bitmap subfield generated in operation S75a. When the upper bound of the block acknowledgement bitmap subfield length negotiated in operation S72a is less than the maximum length of the block acknowledgement bitmap subfield lengths corresponding to the buffer size negotiated in operation S71a, the block acknowledgement may be transmitted during the reduced duration.

Referring to FIG. 7B, the originator 71b and the recipient 72b may negotiate the buffer size in operation S71b. Next, the originator 71b and the recipient 72b may negotiate an upper bound of the duration in operation S72b. For example, the originator 71b and the recipient 72b may negotiate the upper bound of the duration for the block acknowledgement by transceiving each other a negotiation message (for example, a request or a response) including a field representing the upper bound of the duration for the block acknowledgement.

In operation S73b, the originator 71b may set the duration field. For example, the originator 71b may determine the duration for the block acknowledge, based on the buffer size negotiated in operation S71b and the upper bound of the duration negotiated in operation S72b, and may set the duration field to represent the determined duration. When the upper bound of the duration in operation S72b is less than the duration corresponding to the maximum length of the block acknowledgement bitmap subfield lengths corresponding to the buffer size negotiated in operation S71b, the duration field may have a value representing the reduced duration.

In operation S74b, the originator 71b may transmit data, and the recipient 72b may receive data. For example, the originator 71b may transmit data including a plurality of MPDUs to the recipient 72b. Operation 73b described above may be related to operation S74b, subsequent thereto, in which data is transmitted, and accordingly, in the inventive concept, operations S73b and S74b may be collectively referred to as an operation in which the originator 71b provides data to the recipient 72b.

In operation S75b, the recipient 72b may generate the block acknowledgement bitmap subfield. For example, the recipient 72b may generate the block acknowledgement bitmap subfield representing statuses of the MPDUs (or sequences) included in data received in operation S74b, and the generated block acknowledgement bitmap subfield may have a length so that the block acknowledgement including the block acknowledgement bitmap subfield has a duration equal to or less than the upper bound negotiated in operation S72b.

In operation S76b, the recipient 72b may transmit the block acknowledgement, and the originator 71b may receive the block acknowledgement. For example, the recipient 72b may identify the duration negotiated in operation S72b, and may transmit the block acknowledgement during the identified duration. When the upper bound of the duration in operation S72b is less than the duration corresponding to the maximum length of the block acknowledgement bitmap subfield lengths corresponding to the buffer size negotiated in operation S71b, the block acknowledgement may be transmitted during the reduced duration.

Figure 8B:
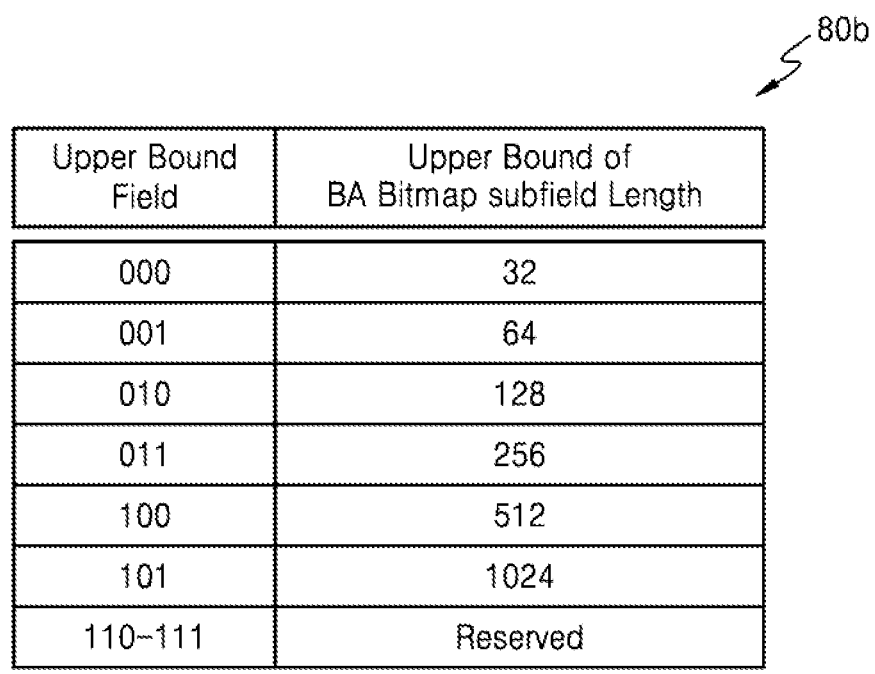

FIGS. 8A and 8B are diagrams of encoding of fields representing upper bounds of block acknowledgement bitmap subfield lengths, according to example embodiments. FIG. 8A illustrates a table 80*a* defining encoding of fields for the compressed block acknowledgement, and FIG. 8B illustrates a table 80*b* defining encoding of fields for the multi-STA block acknowledgement. In some embodiments, encoding of a field defined by the table 80*b* of FIG. 8B may be used. Hereinafter, a field representing the upper bound of the block acknowledgement bitmap subfield length may be referred to as an upper bound field. Hereinafter, FIGS. 8A and 8B will be described with reference to FIG. 4B.

In some embodiments, the upper bound field in FIGS. 8A and 8B may be used to negotiate the block acknowledgement bitmap subfield length. For example, as described above with reference to FIG. 7A, the upper bound field may include a message transceived by the originator and the recipient for negotiation of the upper bound of the block acknowledgement bitmap subfield length. In some embodiments, the upper bound field in FIGS. 8A and 8B may be used by the originator to limit the block acknowledgement bitmap subfield length included in the block acknowledgement corresponding to data transmission. For example, as to be described later with reference to FIG. 10, the upper bound field may be included in data transmitted by the originator, and the recipient may identify the upper bound of the block acknowledgement bitmap subfield length based on the upper bound field.

Referring to FIG. 8A, the upper bound field may represent one of available block acknowledgement bitmap subfield lengths (for example, 64, 256, 512, and 1024) in the compressed block acknowledgement. For example, as illustrated in FIG. 8A, the upper bound field may have a length of 2 bits, and may have a value representing one of four block acknowledgement bitmap subfield lengths.

Referring to FIG. 8B, the upper bound field may represent one of available block acknowledgement bitmap subfield lengths (for example, 32, 64, 128, 256, 512, and 1024) in the multi-STA block acknowledgement. For example, as illustrated in FIG. 8B, the upper bound field may have a length of 3 bits, and may have a value representing one of six block acknowledgement bitmap subfield lengths. In addition, some values (for example, 110 and 111) of the upper bound field may be reserved.

Figure 9A:
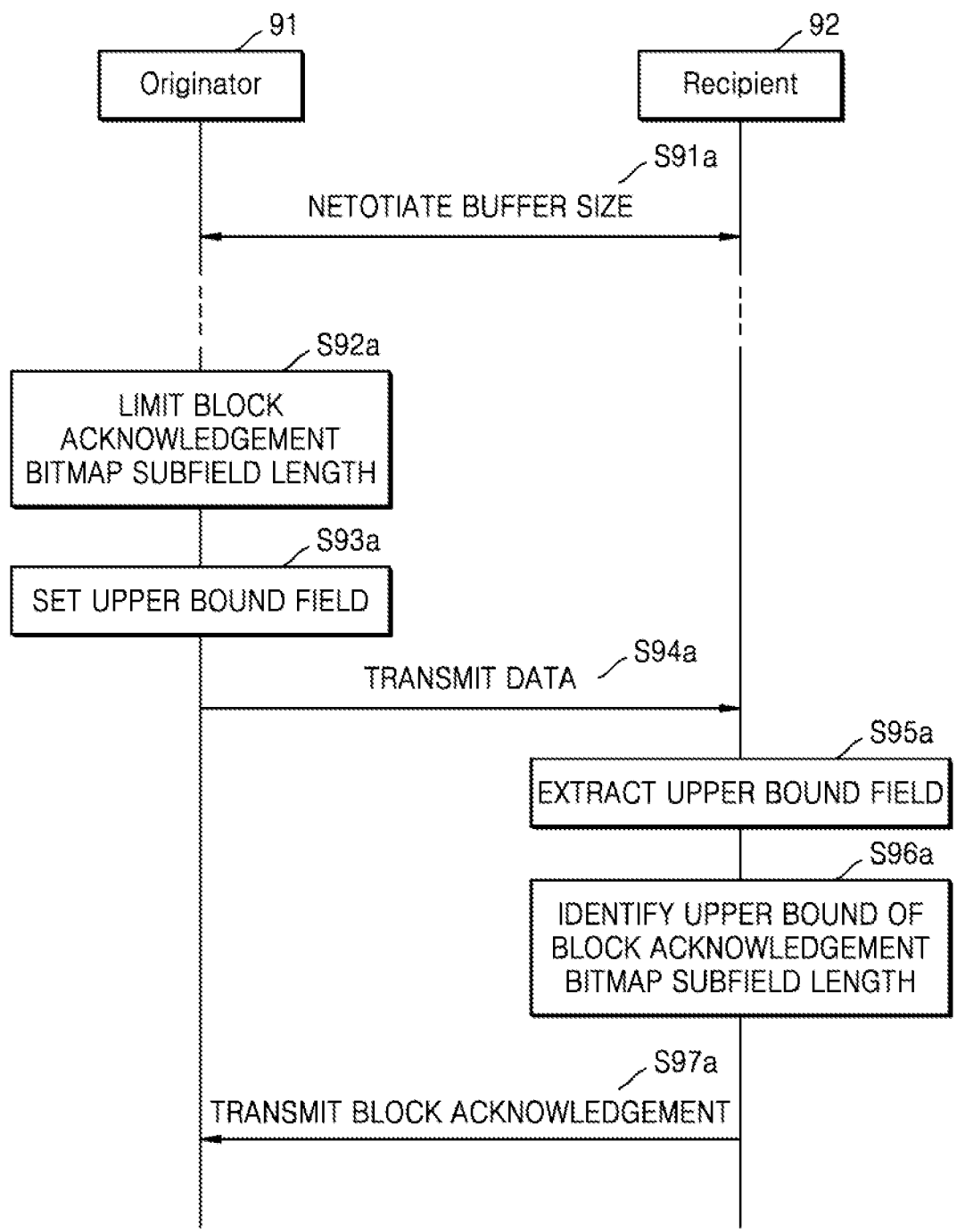
FIGS. 9A and 9B are message diagrams of examples of methods for block acknowledgement during the reduced duration, according to example embodiments.
Figure 9B:
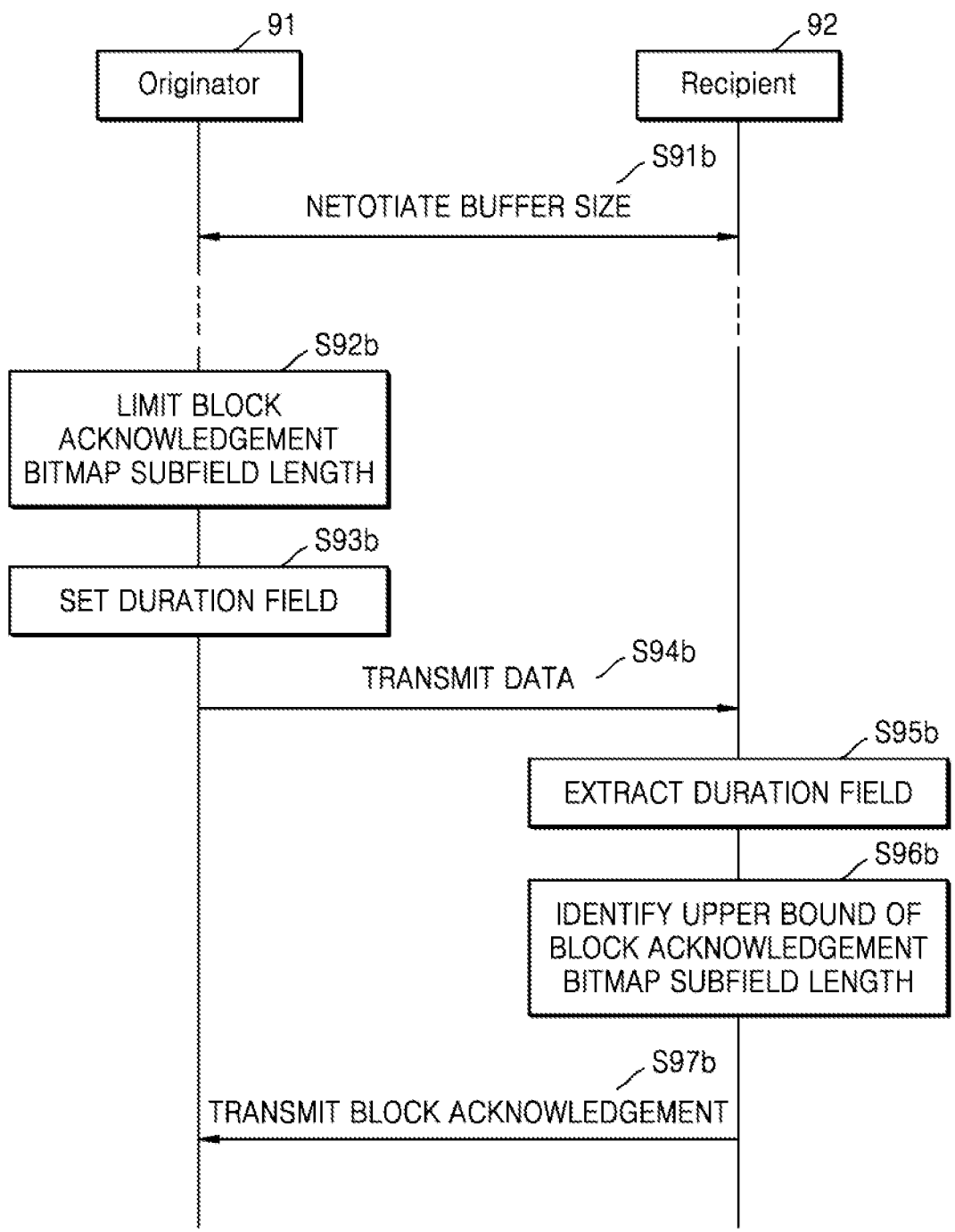

FIGS. 9A and 9B are message diagrams of examples of methods for block acknowledgement during the reduced duration, according to example embodiments. The message diagrams of FIGS. 9A and 9B illustrate operations of an originator 91 and a recipient 92 according to time. In some embodiments, the originator 91 may limit the block acknowledgement bitmap subfield length included in the block acknowledgement corresponding to data transmitted to the recipient 92.

Referring to FIG. 9A, the originator 91 and the recipient 92 may negotiate the buffer size in operation S91*a*. For example, the originator 91 and the recipient 92 may negotiate the buffer size by transceiving each other a negotiation message.

In operation S92*a*, the recipient 91 may limit the block acknowledgement bitmap subfield length. For example, the originator 91 may limit the length of the block acknowledgement bitmap subfield included in the block acknowledgement received in operation S97*a* corresponding to data transmitted in operation S94*a* to be described later. For example, as to be described later with reference to FIG. 10, the originator 91 may provide the upper bound of the block acknowledgement bitmap subfield length to the recipient 92, and accordingly, may explicitly limit the block acknowledgement bitmap subfield length.

In operation S93*a*, the originator 91 may set the upper bound field. The upper bound field, as described above with reference to FIGS. 8A and 8B, may have a value representing the upper bound of the block acknowledgement bitmap subfield length, and may be included in data provided to the recipient 92 in operation 94*a*. For example, the originator 91 may determine the duration for the block acknowledgement based on the limited block acknowledgement bitmap subfield length (S92*a*), and may set the upper bound field based on the determined duration.

In operation S94*a*, the originator 91 may transmit data, and the recipient 92 may receive data. For example, the originator 91 may transmit data including a plurality of MPDUs to the recipient 92. In addition, data may include the upper bound field set in operation S93*a*. Operations S92*a* and S93*a* may be related to operation S94*a*, subsequent thereto, in which data is transmitted, and accordingly, in the inventive concept, operations S92*a*, S93*a*, and S94*a* may be collectively referred to as an operation in which the originator 91 provides data to the recipient 92.

The recipient 92 may extract the upper bound field from the data in operation S95*a*, and the recipient 92 may identify the upper bound of the block acknowledgement bitmap subfield length in operation S96*a*. For example, the recipient 92 may identify the upper bound of the block acknowledgement bitmap subfield length based on the value of the upper bound field extracted in operation S95*a*. Accordingly, the recipient 92 may directly identify the upper bound of the block acknowledgement bitmap subfield length based on the corresponding field.

In operation S97*a*, the recipient 92 may transmit the block acknowledgement, and the originator 91 may receive the block acknowledgement. The block acknowledgement may include the block acknowledgement bitmap subfield with the upper bound of the block acknowledgement bitmap subfield identified in operation S96*a*, for example, a length equal to or less than the block acknowledgement bitmap subfield length limited in operation S92*a*. When the upper bound of the block acknowledgement bitmap subfield length is less than the maximum length of the block acknowledgement bitmap subfield lengths corresponding to the buffer size negotiated in operation S91*a*, the block acknowledgement may be transmitted during the reduced duration.

Referring to FIG. 9B, the originator 91 and the recipient 92 may negotiate the buffer size in operation S91*b*. For example, the originator 91 and the recipient 92 may negotiate the buffer size by transceiving each other a negotiation message.

In operation S92*b*, the originator 91 may limit the block acknowledgement bitmap subfield length. For example, the originator 91 may limit the length of the block acknowledgement bitmap subfield included in the block acknowledgement received in operation S97*b* corresponding to data transmitted in operation S94*b* to be described later. The originator 91 may limit the block acknowledgement bitmap subfield length in various methods based on the size of data transmitted to the recipient 92. For example, the originator 91 may reduce the duration by using the duration field included in the data, and accordingly, may implicitly limit the length of the block acknowledgement bitmap subfield.

In operation S93*b*, the originator 91 may set the duration field. For example, the originator 91 may determine the duration for the block acknowledgement based on the block acknowledgement bitmap subfield length limited in operation S92b, and may set the duration field based on the determined duration.

In operation S94b, the originator 91 may transmit data, and the recipient 92 may receive data. For example, the originator 91 may transmit data including a plurality of MPDUs to the recipient 92. In addition, data may include the duration field set in operation S93b. Operations S92b and S93b may be related to operation S94b, subsequent thereto, in which data is transmitted, and accordingly, in the inventive concept, operations S92b, S93b, and S94b may be collectively referred to as an operation in which the originator 91 provides data to the recipient 92.

The recipient 92 may extract the duration field from the data in operation S95b, and the recipient 92 may identify the upper bound of the block acknowledgement bitmap subfield length in operation S96b. For example, the recipient 92 may identify the reduced duration based on a value of the duration field extracted in operation S95b, and may indirectly identify the upper bound of the block acknowledgement bitmap subfield length based on the reduced duration.

In operation S97b, the recipient 92 may transmit the block acknowledgement, and the originator 91 may receive the block acknowledgement. The block acknowledgement may include the block acknowledgement bitmap subfield with the upper bound of the block acknowledgement bitmap subfield length identified in operation S96b, for example, a length equal to or less than the block acknowledgement bitmap subfield length limited in operation S92b. When the upper bound of the block acknowledgement bitmap subfield length is less than the maximum length of the block acknowledgement bitmap subfield lengths corresponding to the buffer size negotiated in operation S91b, the block acknowledgement may be transmitted during the reduced duration.

Figure 10:
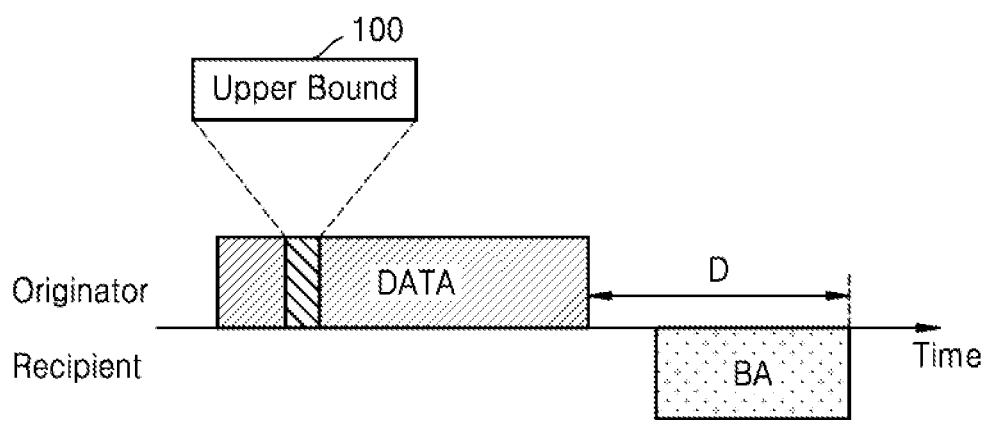
FIG. 10 is a timing diagram of a block acknowledgement mechanism according to an example embodiment.

FIG. 10 is a timing diagram of a block acknowledgement mechanism according to an example embodiment. As illustrated in FIG. 10, the originator may transmit data DATA, and the recipient may transmit the block acknowledgement BA during the identified duration D based on the duration field included in the data DATA.

Referring to FIG. 10, the data DATA transmitted to the recipient by the originator may include an upper bound field 100 representing the upper bound of the block acknowledgement bitmap subfield length. For example, the upper bound field 100, as described above with reference to the table 80a of FIG. 8A, may have a length of 2 bits, or may have a length of 3 bits, as described above with reference to the table 80b of FIG. 8B. The recipient may extract the upper bound field 100 from the data DATA, and may identify the upper bound of the block acknowledgement bitmap subfield length based on the upper bound field 100. When the identified upper bound of the block acknowledgement bitmap subfield length is less than the maximum length of the block acknowledgement bitmap subfield lengths corresponding to the negotiated buffer size, the recipient may transmit the block acknowledgement BA during the reduced duration D.

Figure 11A:
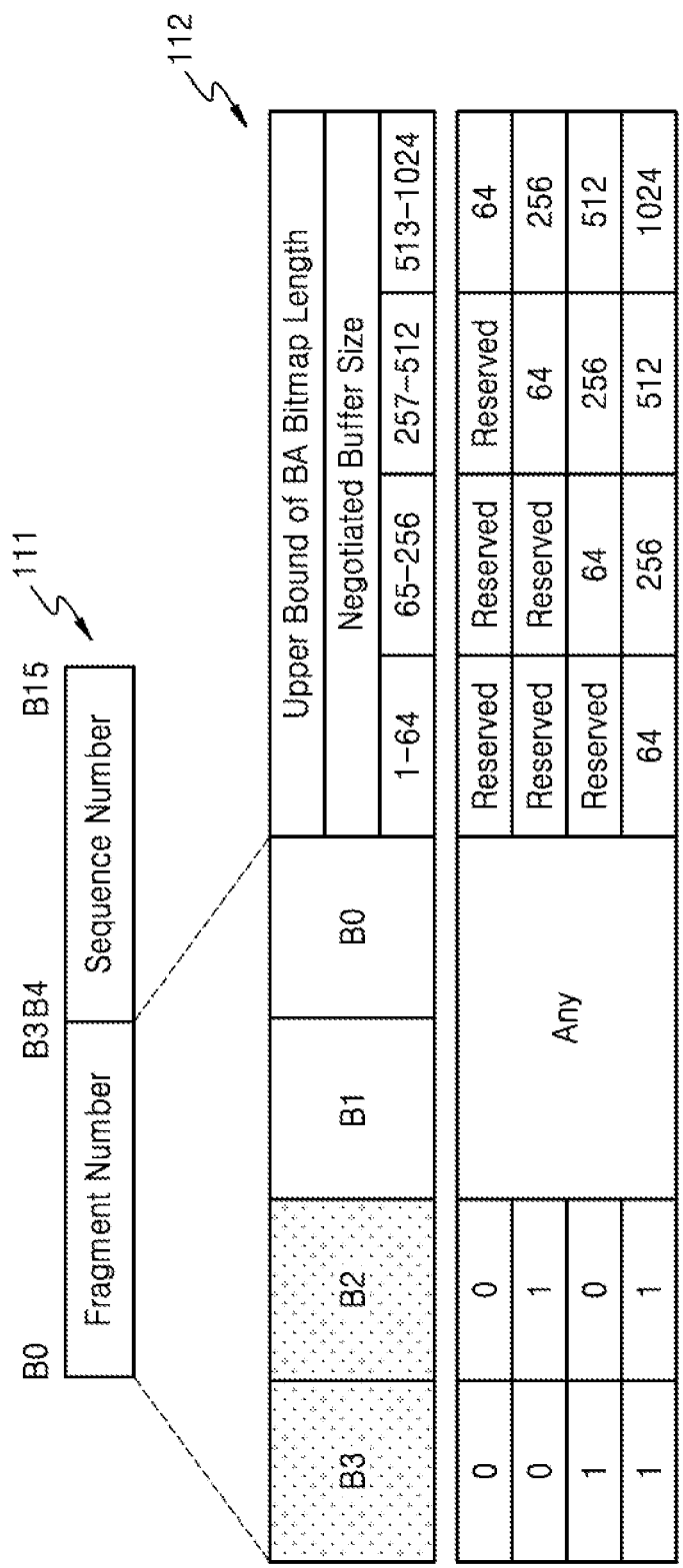
FIGS. 11A and 11B are diagrams of examples of upper bound fields, according to example embodiments.
Figure 11B:
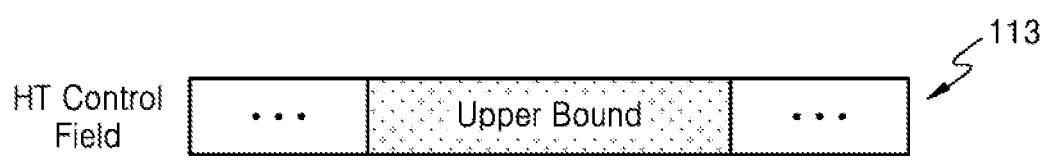

FIGS. 11A and 11B are diagrams of examples of upper bound fields, according to example embodiments. As described above with reference to FIG. 10, in some embodiments, the upper bound field may be included in data transmitted by the originator, and the recipient may identify the upper bound of the block acknowledgement bitmap subfield length based on the upper bound field (or the upper bound subfield) included in data.

Referring to FIG. 11A, the upper bound field may be included in a sequence control field 111. For example, MAC frame 31 (for example, a data frame) described above with reference to FIG. 3 may include the sequence control field 111. As illustrated in FIG. 11A, the sequence control field 111 may include a fragment number subfield and a sequence number subfield. The fragment number subfield may represent a fragment number of a fragment that may be divided from an MAC service data unit (SDU) (MSDU), and a sequence number may represent the number of the MPDU. As illustrated in FIG. 11A, the fragment number subfield may have a length of 4 bits, and two bits (for example, B0 and B1) may be used for representing one of maximum four fragments. Accordingly, the remaining two bits (for example, B2 and B3) may be used as the upper bound field. In other words, the two bits (for example, B2 and B3) of the fragment number subfield may represent one of the block acknowledgement bitmap subfield lengths corresponding to the negotiated buffer size. For example, as illustrated in table 112 in FIG. 11A, a second bit B2 and a third bit B3 of the fragment number subfield may represent one of four block acknowledgement bitmap subfield lengths (for example, 64, 256, 512, and 1024), when the negotiated buffer size is one of 513 through 1024. Accordingly, the recipient may identify the fragment number and the upper bound of the block acknowledgement bitmap subfield length based on the fragment number field.

Referring to FIG. 11B, the upper bound may be included in high throughput (HT) control field 113. The HT control field 113 may have a plurality of variants, and the variant of the HT control field 113 may have a unique structure. As illustrated in FIG. 11B, the HT control field 113 may include an upper bound field, and the upper bound field may represent one of a plurality of block acknowledgement bitmap subfield lengths. Accordingly, the recipient may identify the upper bound of the block acknowledgement bitmap subfield length based on the upper bound field included in the HT control field 113.

Figure 12:
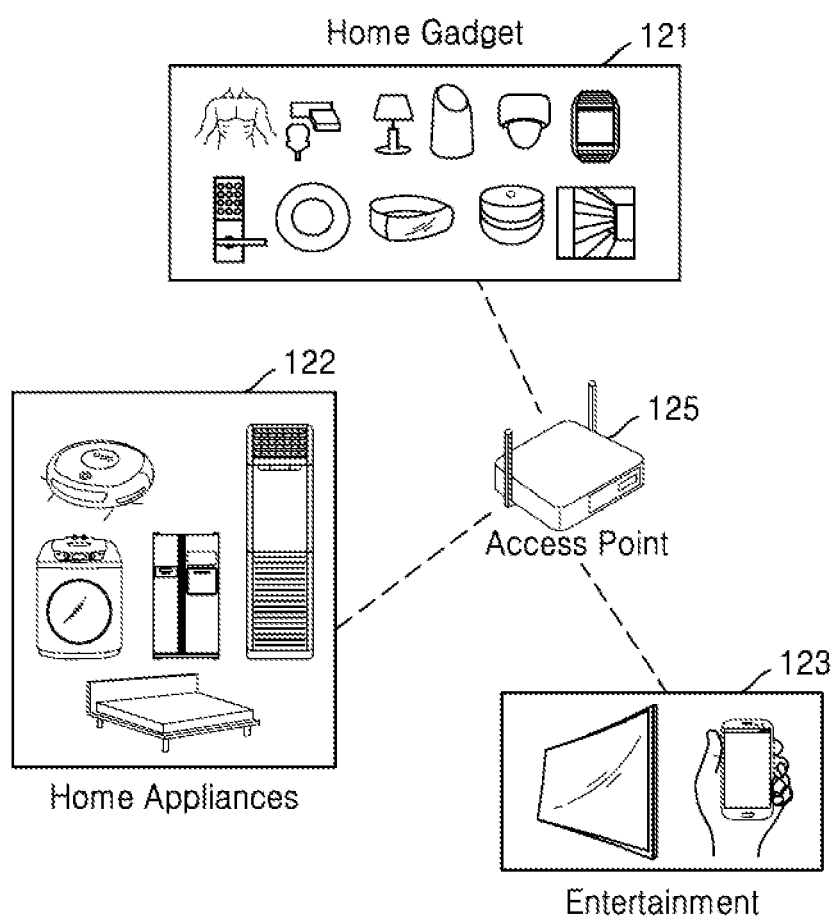
FIG. 12 is a diagram of examples of apparatuses for wireless communication, according to an example embodiment.

FIG. 12 is a diagram of examples of apparatuses for wireless communication, according to an example embodiment. FIG. 12 illustrates an Internet of Things (IoT) network system including home gadgets 121, home appliances 122, entertainment gadgets 123, and an access point 125.

In some embodiments, in the apparatuses for wireless communication in FIG. 12, communication based on the block acknowledgement mechanism described above with reference to drawings may be performed. For example, the access point 125, the home gadgets 121, the home appliances 122, and/or the entertainment gadgets 123 may transmit data as originators, and transmit the block acknowledgement during the reduced duration as recipients. Accordingly, the radio resource waste may be prevented, and the efficiency and throughput of transmission may be increased.

While the inventive concept has been particularly shown and described with reference to embodiments thereof, it will be understood that various changes in form and details may be made therein without departing from the spirit and scope of the following claims.

What is claimed is:

1. A method for wireless communication by a first device, comprising:
    negotiating a buffer size with a second device, wherein a length of a block acknowledgement bitmap subfield is associated with the buffer size;
    determining an upper bound for limiting the length of the block acknowledgement bitmap subfield based on a size of data to be transmitted to be less than the length of the block acknowledgement bitmap subfield associated with the buffer size;

setting, based on the upper bound, at least one of a duration field or a subfield defining a limit on a length of a first block acknowledgement;

transmitting a message comprising the data and at least one of the duration field or the subfield to the second device; and receiving the first block acknowledgement from the second device, the first block acknowledgement comprising a first block acknowledgement bitmap having a length less than or equal to the limit on the length of the first block acknowledgement based on the message.

2. The wireless communication method of claim 1, wherein the subfield corresponds to two bits of a fragment number subfield of a sequence control field included in the data.

3. The wireless communication method of claim 1, wherein the subfield comprises a high throughput (HT) control field included in the data.

4. The wireless communication method of claim 1, wherein setting the subfield defining the limit on the length of the first block acknowledgement further comprises setting the duration field based on the length of the limited first block acknowledgement.

5. The wireless communication method of claim 1, wherein the data comprises an aggregated media access control (MAC) protocol data unit (A-MPDU).

6. The wireless communication method of claim 1, further comprising:
receiving, by the second device, the message comprising the data and at least one of the duration field or the subfield to the second device; and generating, by the second device, the first block acknowledgement having the length less than or equal to the limit on the length of the first block acknowledgement based on the message and representing a status of a medium access control protocol data unit.

7. A first device for wireless communication, the first device comprising:
a transceiver; and
processing circuitry configured to:
negotiate a buffer size with a second device via the transceiver, wherein a maximum block acknowledgement bitmap subfield length is associated with the buffer size;
negotiate an upper bound for limiting a length of a first block acknowledgement or a duration for the first block acknowledgement of the second device via the transceiver, wherein the upper bound less than the maximum block acknowledgement bitmap subfield length;

set, based on the upper bound, at least one of a duration field or a subfield defining a limit on the length of the first block acknowledgement;
transmitting a message comprising at least one of the duration field or the subfield to the second device via the transceiver; and
receive a first block acknowledgement from the second device via the transceiver, the first block acknowledgement comprising a first block acknowledgement bitmap having a length less than or equal to the limit on the length of the first block acknowledgement based on the message.

8. A method for wireless communication by a second device, comprising:
negotiating a buffer size with a first device;
negotiating with the first device, an upper bound of a length of a first block acknowledgement bitmap subfield length, wherein the first block acknowledgement bitmap subfield length is less than the buffer size;
receiving data comprising a duration field specifying the first block acknowledgement bitmap subfield length from the first device;
generating a first block acknowledgement based on the duration field; and
providing the first block acknowledgement to the first device during a first duration corresponding to a length of the first block acknowledgement, the first block acknowledgement comprising a first block acknowledgement bitmap.

9. The wireless communication method of claim 8, wherein the generating the first block acknowledgement comprises generating the first block acknowledgement bitmap with a length equal to or less than the negotiated upper bound when the upper bound of the length of block acknowledgement bitmap is negotiated.

10. The wireless communication method of claim 8, wherein the generating the first block acknowledgement comprises generating the first block acknowledgement bitmap such that the first block acknowledgement has a length equal to or less than the negotiated upper bound when the upper bound of the duration for the first block acknowledgement is negotiated.

11. The wireless communication method of claim 8, wherein the negotiating of the upper bound comprises:
receiving a first negotiation message from the first device; and
providing a second negotiation message to the first device,
wherein at least one of the first negotiation message or the second negotiation message comprises a field defining the upper bound.

* * * * *